(12) United States Patent (10) Patent No.: US 9,877,300 B2
Sen et al. (45) Date of Patent: Jan. 23, 2018

(54) DETERMINING A LOCATION OF A DISCONNECTED DEVICE

(71) Applicant: Hewlett Packard Enterprise Development LP, Houston, TX (US)

(72) Inventors: Souvik Sen, Mountain View, CA (US); Dongho Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,617

(22) PCT Filed: Nov. 24, 2014

(86) PCT No.: PCT/US2014/067069
§ 371 (c)(1),
(2) Date: Jan. 31, 2017

(87) PCT Pub. No.: WO2016/085444
PCT Pub. Date: Jun. 2, 2016

(65) Prior Publication Data
US 2017/0223657 A1 Aug. 3, 2017

(51) Int. Cl.
*H04W 24/00* (2009.01)
*H04W 64/00* (2009.01)
(Continued)

(52) U.S. Cl.
CPC ............ *H04W 64/003* (2013.01); *G01S 5/14* (2013.01); *G01S 13/767* (2013.01); *G01S 13/878* (2013.01)

(58) Field of Classification Search
CPC .......................... H04W 36/0083; H04W 64/00
(Continued)

(56) References Cited

U.S. PATENT DOCUMENTS 7,317,914 B2   1/2008   Adya et al.
7,502,619 B1   3/2009   Katz
(Continued)

FOREIGN PATENT DOCUMENTS

KR   10-2006-0088000 A   8/2006
KR   10-2013-0119376 A   10/2013

OTHER PUBLICATIONS

"Next Generation Indoor Positioning, System Based on WiFi Time of Flight", Sep. 16-20, 2013.

*Primary Examiner* — Kiet Doan
(74) *Attorney, Agent, or Firm* — Hewlett Packard Enterprise Patent Department

(57) ABSTRACT

Described herein are techniques for determining a location of a disconnected device. In an example, a method includes instructing a first access point to sniff a wireless channel for probe request packets from disconnected devices, and instructing the first access point to send a distance-probing packet to a disconnected device after receiving a probe request packet from the disconnected device. The method further includes receiving, from the first access point, a MAC address of the disconnected device determined from the received probe request packet. After receiving the MAC address from the first access point, a group of access points is instructed to send distance-probing packets to the disconnected device. The method further includes receiving, from the first access point and the group of access points, time-of-flight measurements associated with the disconnected device. A location of the disconnected device can be determined using the time-of-flight measurements.

17 Claims, 3 Drawing Sheets

(51) Int. Cl.
*G01S 5/14* (2006.01)
*G01S 13/76* (2006.01)
*G01S 13/87* (2006.01)

(58) Field of Classification Search
USPC ...... 455/456.4, 437, 456.2, 144, 406, 456.1,
455/436, 432.2, 450; 370/331, 252, 329,
370/338, 254, 337, 237, 328
See application file for complete search history.

(56) References Cited

U.S. PATENT DOCUMENTS

| | | |
|---|---|---|
| 7,907,562 B2 | 3/2011 | Murty et al. |
| 2007/0167169 A1* | 7/2007 | Simons ................ G01S 5/0205 455/456.1 |
| 2009/0149198 A1 | 6/2009 | Nam et al. |
| 2010/0150117 A1 | 6/2010 | Aweya et al. |
| 2012/0329477 A1 | 12/2012 | Hail et al. |
| 2013/0094386 A1* | 4/2013 | Kawamura ......... H04W 76/043 370/252 |
| 2013/0237246 A1 | 9/2013 | Aggarwal et al. |
| 2013/0295875 A1 | 11/2013 | Shinozaki et al. |
| 2014/0269391 A1 | 9/2014 | Hansen et al. |
| 2014/0274115 A1* | 9/2014 | Michalson ............ H04W 4/028 455/456.1 |
| 2014/0301363 A1* | 10/2014 | Han ...................... H04W 12/08 370/331 |
| 2015/0024787 A1* | 1/2015 | Ben-Ltzhak ............ H04L 12/18 455/456.4 |
| 2017/0244732 A1* | 8/2017 | Manjunath .......... H04L 63/1416 |

\* cited by examiner

DETERMINING A LOCATION OF A DISCONNECTED DEVICE

BACKGROUND

Location determination systems can estimate a location of a device using various techniques. For example, some location determination systems use time-of-flight measurements of WiFi-capable devices to estimate a distance of a device from a wireless access point. If there are time-of-flight measurements available from multiple access points, a technique such as multilateration may be used to estimate the location of the device. Time-of-flight-based location determination systems have the advantage of being able to determine the location of a device in an indoor environment, where GPS signals may be blocked, for example.

BRIEF DESCRIPTION OF DRAWINGS

The following detailed description refers to the drawings, wherein.

DETAILED DESCRIPTION

Figure 1A:
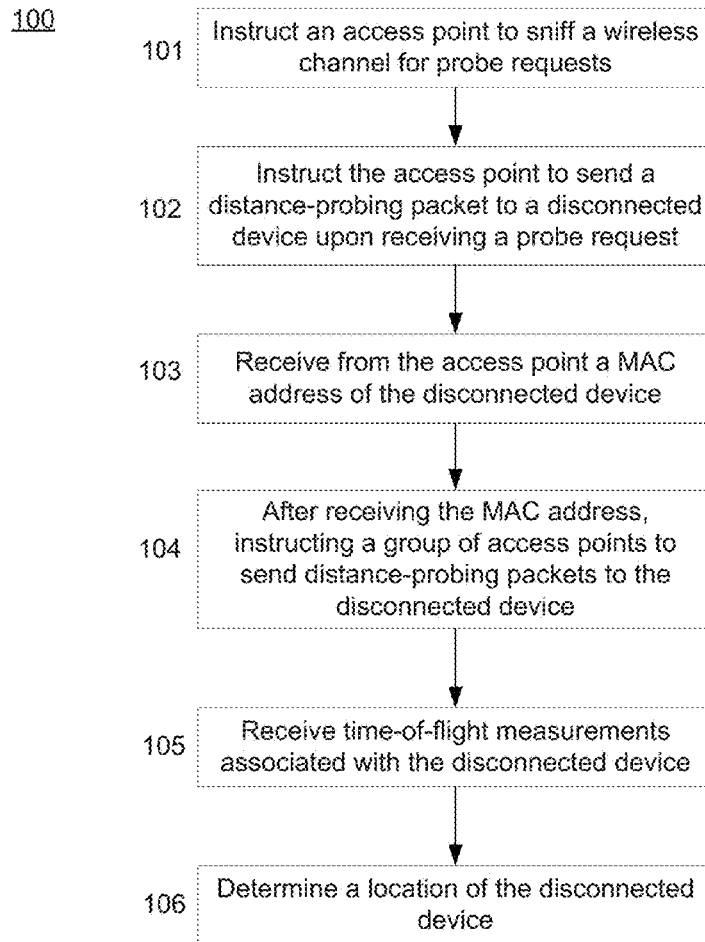
FIG. 1a illustrates a method to determine a location of a disconnected device, according to an example.

Time-of-flight-based location determination systems may determine the location of a device that is connected to a wireless access point (AP). It may be useful to determine the location of a disconnected device. A disconnected device is a device that is not associated with/connected to an AP of the location determination system. In such a case, the AP and location determination system may be unaware of the disconnected device and may not have a MAC address of the disconnected device. This can prevent the system from being able to determine the location of the disconnected device since the system will not have the device's MAC address for directing a distance-probing packet to the device. Additionally, a disconnected device's transceiver may be on for only a short period of time (e.g., due to power saving measures implemented by the device), which can make it difficult for the system to know when to send a distance-probing packet.

Using the techniques described herein, a location determination system can determine the location of a disconnected device. In an example, the location determination system may instruct an access point to sniff a wireless channel for probe request packets from disconnected devices. The system may also instruct the access point to send a distance-probing packet to a disconnected device after receiving a probe request packet from the disconnected device. The access point may determine a MAC address of the disconnected device based on the received probe request packet and may send the MAC address to the system. After receiving the MAC address from the access point, the system may instruct a group of access points to send distance-probing packets to the disconnected device. The system may receive multiple time-of-flight measurements associated with the disconnected device. These may be received from the initial access point and from the group of access points. The system may then determine a location of the disconnected device using the time-of-flight measurements.

As a result, the location determination system may determine the location of a disconnected device. By instructing APs to sniff for probe request packets from disconnected devices, the system can detect a disconnected device and determine its MAC address. Additionally, by sending distance-probing packets soon after receiving a probe request packet, the disconnected device may be more likely to receive (and thus respond to) the distance-probing packet, since it's transceiver is more likely turned on. Various useful applications may be enabled using this technique. For example, these techniques may be used to locate a lost device (e.g., a lost WiFi-enabled device in a mall), and even may be used to locate a missing person (e.g., a child with a smartphone that is lost in the mall). These techniques could also be used to determine an optimal access point for the device to associate with (e.g., a closest AP, a closest AP with appropriate bandwidth, etc.). Additional examples, advantages, features, modifications and the like are described below with reference to the drawings.

Figure 1B:
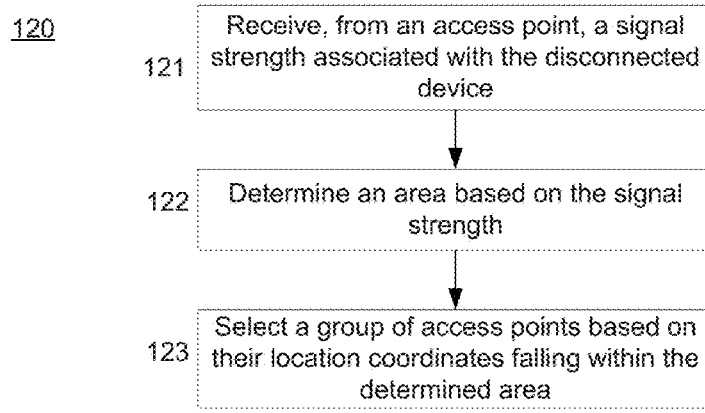
FIG. 1b illustrates a method to select a group of access points for use in the method of FIG. 1a, according to an example.

FIGS. 1a and 1b illustrate methods to determine a location of a device, according to an example. Methods 100 and 120 may be performed by a computing device or computer, such as system 210, and computer 310. Computer-readable instructions for implementing methods 100 and 120 may be stored on a computer readable storage medium. These instructions as stored on the medium are referred to herein as "modules" and may be executed by a computer.

Figure 2:
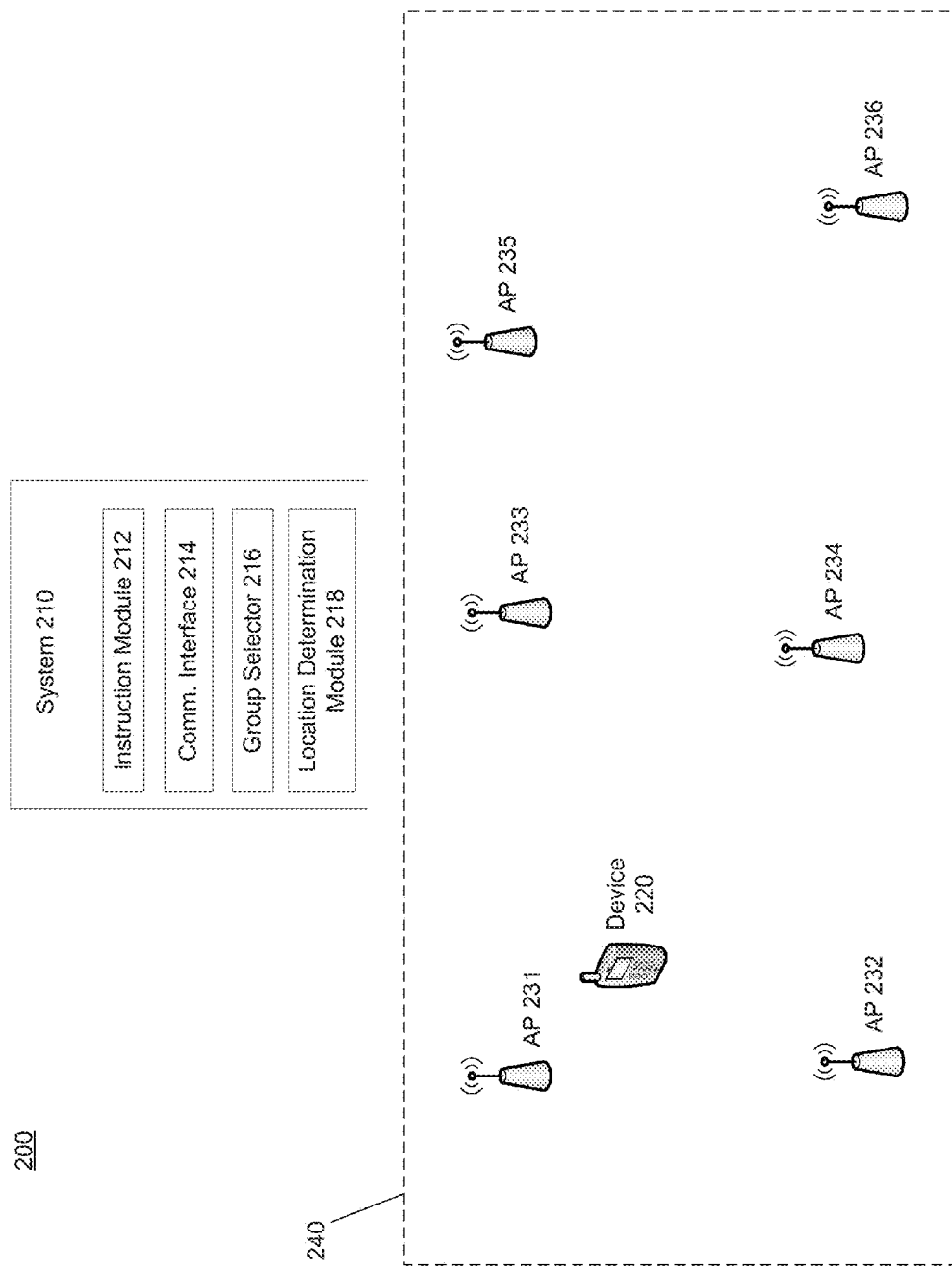
FIG. 2 illustrates a system to determine a location of a disconnected device, according to an example.

Methods 100 and 120 will be described here relative to environment 200 of FIG. 2. Environment 200 may include a system 210, a device 220, and various access points (APs) 231-236. The access points may be located within an area 240, which may be an indoor area, such as a store, mall, office, etc., or an outdoor area, such as a park, city block, etc. Device 220 may be a mobile device, such as a mobile phone, smartphone, tablet computer, laptop computer, or the like, and may include wireless access capability, such as through a wireless card. System 210 may be a location determination system and may be implemented by any number of devices, computers, or the like. System 210 may include an instruction module 212, a communication interface 214 for communicating with APs 231-236, a group selector 216, and a location determination module 218. System 210 may be configured to perform methods 100 and 120, or aspects thereof, and/or instructions 332-336 of FIG. 3. APs 231-236 may be wireless access points that provide wireless network access to devices. The APs may implement known wireless networking protocols, such as IEEE 802.11 variations.

System 210, device 220, and APs 231-236 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 210, device 220, and APs 231-236 may include one or more machine-readable storage media separate from the one or more controllers.

Turning to FIG. 1a, method 100 may be used to determine a location of a disconnected device, according to an example. For illustration, method 100 will be described as executed by system 210. A brief overview of time-of-flight and multilateration will now be provided before describing method 100.

In general, time-of-flight (ToF) of a wireless packet is the time which it takes for a wireless packet to travel for a given distance. A WiFi-based positioning system can use ToF between a mobile device and an access point (AP) to estimate a distance between the device and the AP. When a positioning system has estimated distances between a device and at least three APs, the system can decide a coordinate (x,y) of the device by a multilateration technique. For example, using ToF measurements from APs 231, 232, and 233, an estimated location of device 220 could be determined using multilateration.

To gather ToF measurements, each AP transmits a distance-probing packet (e.g., implemented by a basic WiFi-compliant (i.e., 802.11) NULL packet) to a device, such as device 220. The distance-probing packet is sent specifically to device 220 by specifying device 220's MAC address as the destination address in the packet. In response to the distance-probing packet, device 220 sends back an acknowledgement (ACK) packet to the AP within SIFS (Short Interframe Space). SIFS is defined in the WiFi standard. The AP records when it transmits the probe packet (Time-of-Departure) and when it receives the corresponding ACK packet (Time-of-Arrival). With these measurements, ToF can be calculated as follows:

$$\text{ToF}=(\text{ToA}-\text{ToD}-\text{SIFS})/2. \quad (\text{Eq. 1})$$

Each AP sends its ToF measurement to system 210. When system 210 receives a ToF measurement from an AP, it estimates a distance between the device and the AP as follows:

$$d_n=(\text{ToF}-\text{baseToF})*c, \quad (\text{Eq. 2})$$

where $d_n$ is a distance between a device and $AP_n$, base ToF represents the ToF when a device is very close to an AP and essentially corresponds to the delay in packet reception, processing, and transmission caused by the device's chipset, and c is a constant representing the speed of light. After system 210 calculates distances between the device and multiple APs, it calculates coordinates (<Lx,Ly>) of the device by a multilateration technique.

Multilateration is briefly explained here. If it is assumed that each estimated distance $d_n$ has no error, the following equation for determining distance from an AP holds for each $AP_n$:

$$d_n\|<AP_{n,x},AP_{n,y}>-<L_x,L_y>\| \quad (\text{Eq. 3})$$

where $AP_{n,x}$ and $AP_{n,y}$ are x and y coordinates of $AP_n$ and $\|.\|$ is the distance between two coordinates. With ToF measurements and location coordinates from three APs (coordinates of all APs within the location determination system will be stored in memory for use by the system), a 2D coordinate <Lx,Ly> may be obtained by solving a system of linear equations, where the system includes the equation above for each of the three APs. However, since the estimated distance is known to have some error due to noise in the ToF measurement, these equations do not hold. Thus, instead of solving a system of linear equations, a multilateration technique can be used to obtain an estimated location <$EL_x$, $EL_y$> such that the sum of $\| \|<AP_{n,x},AP_{n,y}>-<EL_x, EL_y>\|-d_n\|$ is minimized. One example of such an estimation technique is the Gauss-Newton algorithm.

As discussed previously, a disconnected device is a device that is not associated with/connected to an AP of the location determination system. In such a case, the AP and location determination system may be unaware of the disconnected device and may not have a MAC address of the disconnected device. Thus, the disconnected device may be unknown to the location determination system. This can prevent the system from being able to determine the location of the disconnected device since the system will not have the device's MAC address for directing a distance-probing packet to the device. Additionally, a disconnected device's transceiver may be on for only a short period of time (e.g., due to power saving measures implemented by the device), which can make it difficult for the system to know when to send a distance-probing packet. Going forward, device 220 in FIG. 2 is considered to be a disconnected device. That is, it is not associated with any of APs 231-236. Method 100 may be used to determine the location of device 220.

Method 100 may begin at 101, where system 210 (e.g., via instruction module 212) may instruct an AP to sniff a wireless channel for probe requests. The purpose of this instruction may be to detect disconnected devices in the vicinity of the AP. A probe request is an 802.11-compliant packet that a WiFi-enabled device may broadcast to find available APs in its vicinity on a particular wireless channel. Typically, available APs would respond to the probe request to alert the device of the APs existence and to advertise its capabilities. The device would then be able to begin an association process with the AP to join the AP's wireless local area network. System 210 may instruct all of the APs that are part of the location determination system to sniff for probe requests. Thus, for example, all of APs 231-236 may be instructed to sniff for probe requests.

At 102, system 210 (e.g., via instruction module 212) may also instruct the AP(s) to send a distance-probing packet to a disconnected device after receiving a probe request from the disconnected device. This instruction may be provided at the same time as the instruction to sniff for probe requests. This may enable the AP(s) to immediately send a distance-probing packet upon receiving and processing a probe request from the disconnected device. By sending the packet immediately (e.g., without undue delay after accounting for time to receive and process the probe request, and generate the distance-probing packet), the disconnected device may be more likely to receive and respond to the distance-probing packet, since its transceiver is likely still turned on and tuned to the same wireless channel as the AP. As described previously, the distance-probing packet may be an 802.11 compliant NULL packet.

Furthermore, the AP(s) may be instructed to send the distance-probing packet before responding to the probe request packet. This may be done to enable system 210 to instruct other APs to send distance-probing packets to the disconnected device prior to beginning an association process with the disconnected device. If an association process were started before other APs had a chance to send distance-probing packets, the disconnected device might choose to ignore the distance-probing packets, which could thwart the location determination process.

At 103, system 210 may receive (e.g., via communication interface 214) from an AP a MAC address of a disconnected device 220. The AP may be one of the APs instructed to sniff for probe requests. For example, given the proximity of AP 231 to disconnected device 220, AP 231 may be the first AP among APs 231-236 to receive a probe request from device 220. The MAC address may be determined by examining the probe request packet received from the disconnected device 220. Thus, for example, AP 231 may extract the MAC address and send it to system 210 and identify it as a MAC address of a disconnected device. AP 231 may also use the MAC address for sending the distance-probing packet to the device 220, as described in block 102. Note that multiple APs may sniff a probe request from device 220, and so multiple APs may report the MAC address to system 210.

At 104, after receiving the MAC address, system 210 (e.g., via instruction module 212) may instruct a group of APs to send distance-probing packets to the disconnected device. Each AP in the group may direct a distance-probing packet specifically to the disconnected device using the MAC address of the disconnected device, as provided by system 210. System 210 may provide this instruction to the APs quickly (e.g, shortly after receiving the MAC address), so as to increase the likelihood that the APs can send the distance-probing packets to the disconnected device while the device's transceiver is still on and tuned in to the same wireless channel. If one of the APs in the group is broadcasting on a second wireless channel different from the wireless channel currently being used for this process, the AP may be instructed to switch to the wireless channel for the purpose of sending the location-probing packet to disconnected device 220.

System 210 (e.g., via group selector 216) may select the APs for the group in various ways. In an example, all APs in the location determination system may be instructed to send distance-probing packets to the disconnected device. The AP that initially provided the device's MAC address (e.g., AP 231) may be excluded from the group, since it will already be sending a distance-probing packet to device 220 pursuant to the instruction from block 102. In another example, APs may be selected for the group based on their proximity to the AP that shared the MAC address of the disconnected device with system 210. For example, if AP 231 received the probe request from device 220 and shared the MAC address with system 210, the group selector 216 may select AP 232, AP 233, and AP 234 for the group, based on their proximity to AP 231. However, if system received the MAC address from other APs, those other APs may be excluded from the group, since they will already be sending distance-probing packets to the device 220 pursuant to the instruction from block 102.

In another example, the APs can be selected for the group using method 120 of FIG. 1b. At 121, system 210 may receive from an AP a signal strength associated with the disconnected device. The signal strength may be a measure of the received signal strength indicator (RSSI) value between the AP and the disconnected device. This signal strength may have been received from the AP (e.g., AP 231) at the same time as receiving the disconnected device's MAC address. At 122, group selector 216 may determine an area based on the signal strength. The area may be an estimated satisfactory wireless connectivity area for the disconnected device, given location of the first AP and the signal strength and location of the original AP. At 123, APs within the area (e.g. the location coordinates of the AP fall within the area) may be selected for the group. In this way, a group of APs may be selected based on the likelihood that the APs will be able to maintain a satisfactory connection (and thus be able to communicate reliably) with the disconnected device. Inherent in the determination is that the APs within the determined area are likely closer to the disconnected device than other APs.

Returning to FIG. 1a, at 105, system 210 (e.g., via communication interface 214) may receive time-of-flight measurements associated with the disconnected device. The time-of-flight measurements may be received from any APs that sniffed a probe request packet from disconnected device 220 as well as from the APs in the group. The time-of-flight measurements may be obtained by each such AP as previously described at the outset.

At 106, system 210 (e.g., via location determination module 218) may determine a location of the disconnected device using time-of-flight measurements received from three or more APs. The location may be determined as previously described at the outset. For example, system 210 may determine a respective distance of the disconnected device using the time-of-flight measurements received from the three or more APs, and may then determine a location of the disconnected device based on the determined distances and the location of the three or more of the access points.

Figure 3:
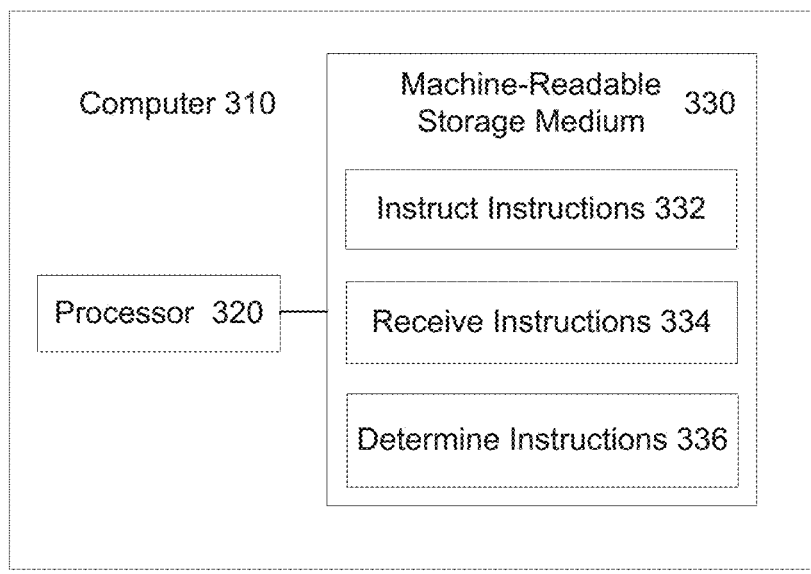
FIG. 3 illustrates a computer-readable medium to determine a location of a disconnected device, according to an example.

FIG. 3 illustrates a computer-readable medium to determine a location of a disconnected device, according to an example. Computer 310 may be part of system 210. The computer may include one or more controllers and one or more machine-readable storage media, as described with respect to system 210, for example.

Processor 320 may be at least one central processing unit (CPU), at least one semiconductor-based microprocessor, other hardware devices or processing elements suitable to retrieve and execute instructions stored in machine-readable storage medium 330, or combinations thereof. Processor 320 can include single or multiple cores on a chip, multiple cores across multiple chips, multiple cores across multiple devices, or combinations thereof. Processor 320 may fetch, decode, and execute instructions 332-336 among others, to implement various processing. As an alternative or in addition to retrieving and executing instructions, processor 320 may include at least one integrated circuit (IC), other control logic, other electronic circuits, or combinations thereof that include a number of electronic components for performing the functionality of instructions 332-336. Accordingly, processor 320 may be implemented across multiple processing units and instructions 332-336 may be implemented by different processing units in different areas of computer 310.

Machine-readable storage medium 330 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 330 can be computer-readable and non-transitory. Machine-readable storage medium 330 may be encoded with a series of executable instructions for managing processing elements.

The instructions 332-336 when executed by processor 320 (e.g., via one processing element or multiple processing elements of the processor) can cause processor 320 to perform processes, for example, methods 100 and 200, and/or variations and portions thereof. Instructions 332-336 will now be briefly described, which description should be read in light of the description of methods 100, 200 and system 210 above.

For example, instruct instructions 332 may cause processor 320 to instruct a first access point to sniff a wireless channel for probe request packets from disconnected devices and to send a distance-probing packet to a disconnected device after receiving a probe request packet from the disconnected device. Receive instructions 334 may cause processor 320 to receive, from the first access point, a MAC address of the disconnected device determined from the received probe request packet. Instruct instructions 332 may additionally cause processor 320 to instruct a group of access points to send distance-probing packets to the disconnected device using the MAC address. Receive instructions 334 may additionally cause processor 320 to receive time-of-flight measurements associated with the disconnected device. Determine instructions 336 may cause processor 320 to determine a location of the disconnected device using the time-of-flight measurements.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method for determining a location of a disconnected device, comprising, by a processor:
instructing a first access point to sniff a wireless channel for probe request packets from disconnected devices;
instructing the first access point to send a distance-probing packet to a disconnected device after receiving a probe request packet from the disconnected device and before sending a probe response packet
receiving, from the first access point, a media access control (MAC) address of the disconnected device determined from the received probe request packet;
after receiving the MAC address from the first access point, instructing a group of access points to send distance-probing packets to the disconnected device base on the MAC address;
receiving, from the first access point and the group of access points, time-of-flight measurements associated with the disconnected device based on a response to the distance-probing packets; and
determining a location of the disconnected device using the time-of-flight measurements;
wherein the processor is part of a location determination system; and
wherein the disconnected device is a device that is unknown to the location determination system.

2. The method of claim 1, wherein the disconnected device is a device that is not associated with any of the access points.

3. The method of claim 1, wherein the group of access points is selected based on their proximity to the first access point.

4. The method of claim 1, comprising:
receiving, from the first access point, a signal strength associated with the disconnected device;
determining an area based on the signal strength; and
selecting the group of access points based on their location coordinates falling within the determined area.

5. The method of claim 1, wherein the first access point is configured to send the distance-probing packet immediately upon receiving the probe request packet from the disconnected device.

6. The method of claim 1, wherein the distance-probing packets are sent directly to the disconnected device using the MAC address.

7. The method of claim 1, wherein if a particular access point in the group of access points is broadcasting on a second wireless channel different from the wireless channel, the processor instructs the particular access point to switch to the wireless channel to send the location-probing packet.

8. The method of claim 1, wherein multiple access points are instructed to sniff the wireless channel or a different wireless channel for probe request packets from disconnected devices.

9. The method of claim 1, wherein the distance-probing packet is a null frame packet.

10. The method of claim 1, wherein the first access point is to send the distance-probing packet prior to responding to the probe request packet with a probe response packet.

11. The method of claim 1, including:
receiving, by the first access point, a response from the disconnected device to the distance-probing packet within a short interframe space (SIFS); and
determining, by the first access point, a time-of-flight measurement based on the sending of the distance-probing packet and the receiving of the response from the disconnected device.

12. The method of claim 11, wherein the response from the disconnected device to the distance-probing packet is an ACK packet.

13. The method of claim 1, including:
receiving, from the first access point and the group of access points, signal strength measurements associated with the disconnected device; and
determining a location for the disconnected device based in part on the signal strengths associated with the disconnected device.

14. A location determination system for determining a location of a disconnected device, comprising:
an instruction module to instruct a first access point to capture probe request packets from disconnected devices and to send a distance-probing packet to a disconnected device in response to receiving a probe request packet from the disconnected device and before sending a probe response packet to the disconnected device, wherein the disconnected device is a device that is unknown to the location determination system;
a communication interface to receive from the first access point (1) a media access control (MAC) address of the disconnected device based on the probe request packet and (2) a time-of-flight measurement determined based on a response of the disconnected device to the distance-probing packet within a short interframe space (SIFS);
a group selector to select a group of access points, the instruction module to instruct the group of access points to send distance-probing packets to the disconnected device using the MAC address; and
a location determination module to determine a location of the disconnected device using time-of-flight measurements received from three or more of the access points in the group and the first access point.

15. The location determination system of claim 14, wherein the location determination module is to determine the location of the disconnected device by:
determining a respective distance of the disconnected device using the time-of-flight measurements received from the three or more of the access points in the group and the first access point; and
determining a location of the disconnected device based on the determined distances and the location of the three or more of the access points in the group and the first access point.

16. The location determination system of claim 14, wherein the group selector is to select the group of access points from a larger group of access points based on a determination that access points in the group are closer to the disconnected device than other access points.

17. A non-transitory computer-readable storage medium storing instructions that, when executed by a processor, cause the processor to:
instruct an access point to sniff a wireless channel for probe request packets from disconnected devices and to send a distance-probing packet to a disconnected device after receiving a probe request packet from the disconnected device and before sending a probe request packet to the disconnected device;
receive, from the access point, a media access control (MAC) address of the disconnected device determined from the received probe request packet;
instruct a group of access points to send distance-probing packets to the disconnected device using the MAC address and based on the wireless channel sniffed by the access point;
receive time-of-flight measurements associated with the disconnected device; and
determine a location of the disconnected device using the time-of-flight measurements:
wherein the processor is part of a location determination system; and
wherein the disconnected device is unknown to the location determination system.

* * * * *